United States Patent [19]
Hochbein et al.

[11] Patent Number: 5,735,055
[45] Date of Patent: Apr. 7, 1998

[54] METHOD AND APPARATUS FOR MEASURING THE THICKNESS OF AN ARTICLE AT A PLURALITY OF POINTS

[75] Inventors: David E. Hochbein, Sarver, Pa.; Craig J. Kerney, Brea, Calif.

[73] Assignee: Aluminum Company of America, Pittsburgh, Pa.

[21] Appl. No.: 636,433

[22] Filed: Apr. 23, 1996

[51] Int. Cl.$^6$ .................................................. G01B 5/06
[52] U.S. Cl. .................. 33/554; 33/783; 33/552
[58] Field of Search ................... 33/783, 784, 549, 33/551, 552, 553, 554, 555

[56] References Cited

U.S. PATENT DOCUMENTS

| | | | |
|---|---|---|---|
| 3,440,738 | 4/1969 | Mangan | 33/554 |
| 3,528,002 | 9/1970 | Dunlavey | 324/34 |
| 3,581,402 | 6/1971 | London et al. | 33/555 |
| 3,593,427 | 7/1971 | Abarotin | 33/174 |
| 3,990,005 | 11/1976 | Abe et al. | 324/61 R |
| 4,400,884 | 8/1983 | Baresh et al. | 33/552 |
| 4,750,141 | 6/1988 | Judell et al. | 33/551 |
| 4,897,925 | 2/1990 | Johns | 33/551 |
| 5,216,819 | 6/1993 | Givler | 33/555 |
| 5,272,443 | 12/1993 | Winchip et al. | 324/662 |
| 5,485,082 | 1/1996 | Wisspeintner et al. | 324/202 |

FOREIGN PATENT DOCUMENTS

| | | | |
|---|---|---|---|
| 137508 | 6/1987 | Japan | 33/551 |
| 321302 | 12/1989 | Japan | 33/784 |
| 2124386 | 6/1983 | United Kingdom . | |

*Primary Examiner*—Thomas B. Will
*Attorney, Agent, or Firm*—David J. Hill; Elroy Strickland

[57] ABSTRACT

A method and apparatus are disclosed for measuring the thickness of an article having upper and lower surfaces and substantial length and width dimensions, such as a sheet or plate of aluminum or another metal. A table is provided for supporting the article, and one or more openings across the length and width of the table provide access to the lower surface of the article. The table has a plurality of thickness references, each of which has an upper and a lower surface, and the thickness references are spaced across the width of the table at or near a first end. A plurality of pairs of opposed sensors are mounted at spaced intervals on a carriage that extends across the width of the table and is adapted for movement in the longitudinal direction of the table. A first member of each pair of sensors is disposed above the level of the supporting surface of the table opposite a second member that is disposed therebelow. The article is placed on the supporting surface of the table with one end of the article near the second end of the table so that the article does not cover the thickness references. The carriage is then positioned at a first location where each pair of sensors mounted thereon will be in alignment with and accessible to a thickness reference, with the first member of each such pair of sensors being disposed above the thickness reference opposite the second member that is disposed below it. Each pair of sensors is activated to measure the thickness of the thickness reference and calibrated according to the thickness so measured. The carriage is then moved, in stepwise fashion, to one or more subsequent locations along the length of the table that define points of measurement for the sensor pairs, so that at each such location the first member of each pair of sensors mounted on the carriage is disposed above the article on the table opposite the second member that is disposed therebelow and in alignment with an opening in the table that provides access to the lower surface of the article. Each pair of sensors is activated at each subsequent location to which the carriage is moved to measure the thickness of the article at such points of measurement.

27 Claims, 5 Drawing Sheets

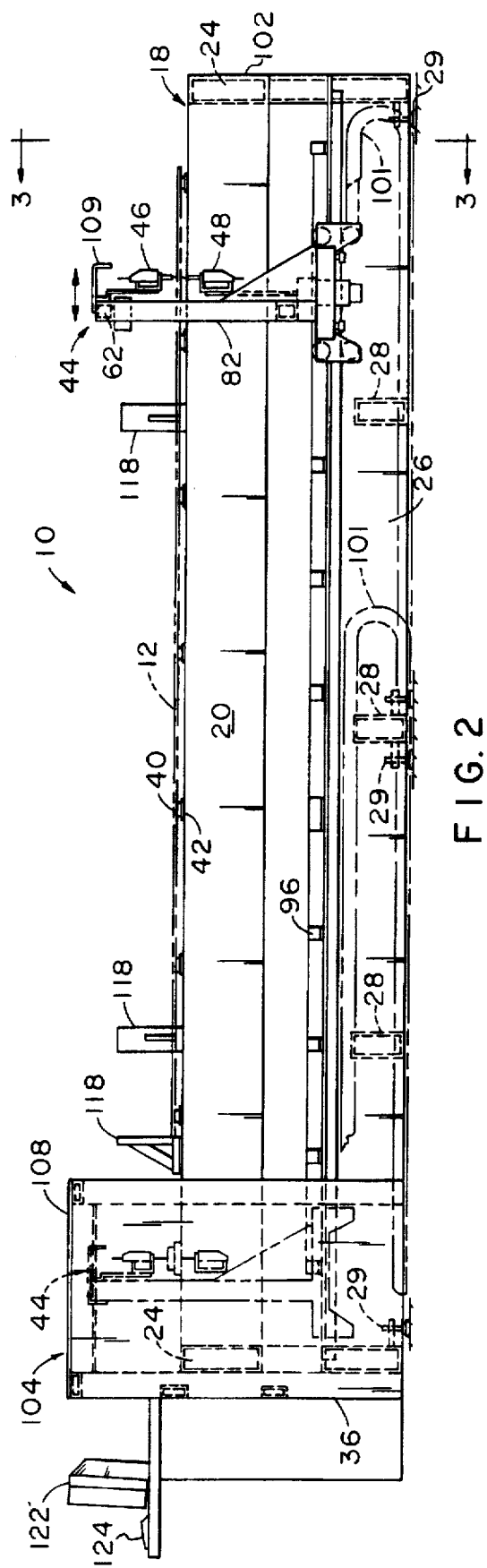
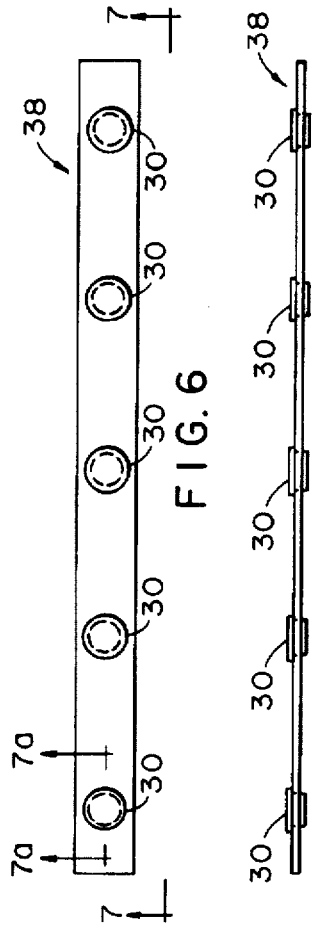

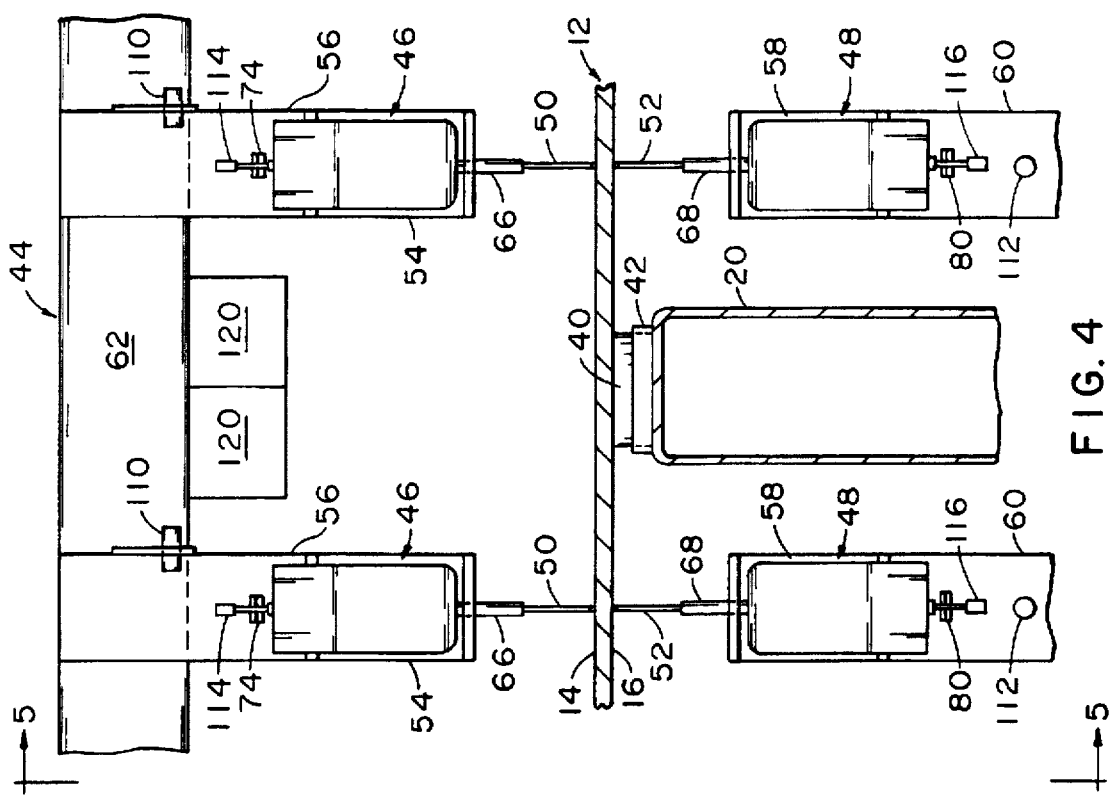
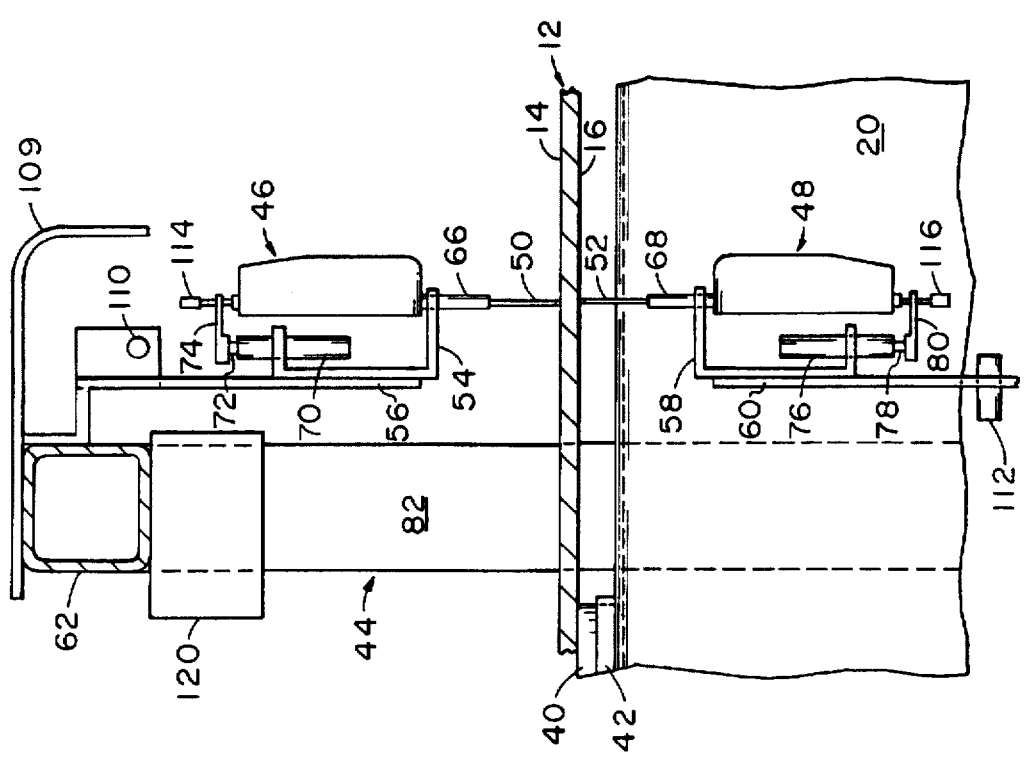

METHOD AND APPARATUS FOR MEASURING THE THICKNESS OF AN ARTICLE AT A PLURALITY OF POINTS

FIELD OF THE INVENTION

This invention relates generally to the measurement of the thickness of an article that may be characterized as having upper and lower surfaces and substantial length and width dimensions, such as a sheet or plate of aluminum or another metal, to insure quality control or for other purposes. More particularly, the invention relates to the precise measurement of thickness of such an article at a plurality of points spaced across the width thereof.

BACKGROUND OF THE INVENTION

It has been known for many years that the thickness of an article may be measured near its edge using a mechanical caliper. Such a device may be used to measure the thickness of an article within a few thousandths of an inch, but it is limited as to the location of the measurements it can make by the reach of its mechanical arms. It has also been known to measure the thickness of an article by employing a non-contact sensor, such as a laser probe or a capacitance sensor, or in the alternative, a contacting sensor, that is mounted on a test stand. However, such an arrangement, by which the article is placed on the stand within the range of the sensor, is also limited by the size of the article that can be accommodated on the test stand, as well as by the ease with which the article can be handled. Consequently, it is known to use such a test stand to measure the thickness of small and easily handled products, such as semiconductor wafers, and such a measuring system is described in U.S. Pat. No. 3,990,005 of Abbe et al. This system utilizes two distance-gauging capacitance probes, placed on opposite sides of a semiconductor wafer, to measure its thickness. However, the system of Abbe et al. is not generally practical for use in connection with the measurement of thickness of larger articles having substantial length and width dimensions, such as, for example, flat metal products.

A flat metal product, as that term is used herein, is a flat article made of metal, having upper and lower surfaces, and length and width dimensions that are substantial, relative to its thickness. Flat metal products are generally produced by a rolling process, although some such products may also be produced by a casting process. Flat metal products having a thickness of less than 0.006 inches (0.15 mm) are generally referred to as foil. Those having a thickness equal to or greater than 0.25 inches (6.35 mm) are generally referred to as plate. Those having thicknesses between these limits are generally referred to as sheet.

It is important that a purchaser of a flat metal product be assured that the product meets all quality specifications and standards that he has established. Among the most important of these, in many instances, is thickness. It may also be of critical importance that the thickness of a flat metal product be assured within a very narrow tolerance across the width and length of the product. However, because of the difficulties in providing measurements of the thickness of flat metal articles across their width and length, it has been somewhat common in the aluminum and steel industries, for example, to test the thickness of a flat metal product by cutting it into small test samples that can be accommodated by the reach of the arms of a mechanical caliper, or that can be easily manipulated to be placed on a test stand. Of course, this method of assuring control of the thickness of the product has the unfortunate side effect of destroying the very product which provides such assurance.

One such method for measuring the thickness of a sample portion of a flat metal product in a test stand is described in U.S. Pat. No. 5,272,443 of Winchip et al. This method and associated apparatus are primarily directed to measurement of the surface imperfections and variations, or "chatter", such as may be caused by vibration in a roll stand that is used to make a flat metal product. The Winchip method and apparatus utilizes a long clamping device having elongated, rigid jaws with flat, planar clamping surfaces to hold a sample of a flat metal product so as to eliminate any general curvature therein and to make it substantially perfectly flat. A portion of the sample mounted in the jaws extends outside the jaws so that a sensor probe, mounted in a C-frame adjacent to a surface of the extending portion of the sample, may be utilized for scanning the surface. The probe is a non-contact capacitance sensor, the inspecting surface of which forms, with the surface of the sample, an electrical capacitor. The probe is mounted on a precision motorized slide that moves it across the surface of a portion of the sample in a perfectly flat plane. Any change in the output of the sensor is the result of changes in the height of the sample surface relative to the sensor. Another embodiment of the Winchip method may be used to measure changes in the thickness or "profile" of a sample of a flat metal product, by combining the measurements of two capacitance sensors, one disposed above the sample and the other disposed therebelow. As the sensing probes travel along the sample, changes in the electrical capacitance measured by the sensing mechanism represent a measurement of the profile of the sample. It should be appreciated that the Winchip apparatus is primarily adapted to measuring changes in the thickness of a sample of a product, rather than the absolute thickness thereof. And in any event, this method and apparatus is not suitable for use on a flat metal product having substantial length and width dimensions, but only on a small sample taken from such a product. Furthermore, by requiring that the sample to be measured first be clamped so as to be substantially perfectly flat, the measurement of chatter or the profile of a sample requires considerable set-up time. Finally, the Winchip method and apparatus, with its sensors mounted in a C-frame adjacent to a surface of the sample extending from the clamp, can only be used to measure the chatter or profile of a sample near its edge, or within a distance from the edge corresponding to the reach of the arms of the C-frame.

OBJECTS AND ADVANTAGES OF THE INVENTION

Accordingly, it is an object of the invention claimed herein to provide a method and apparatus that can be used to measure the thickness of a flat metal product or similar article having substantial length and width dimensions. It is another object of this invention to provide such a method and apparatus that can be utilized to measure the thickness of such an article in a non-destructive fashion. It is yet another object of this invention to provide such a method and apparatus that can be used, requiring little set-up preparation or time, to measure the thickness of such an article across its width and length. It is still another object of the invention to provide such a method and apparatus that can be used to measure the thickness of an article at a plurality of predetermined locations across its width and length, and to provide a map of the thicknesses so measured.

Additional objects and advantages of this invention will become apparent from an examination of the drawings and the ensuing description.

SUMMARY OF THE INVENTION

A method and apparatus are disclosed for measuring the thickness of an article having upper and lower surfaces and substantial length and width dimensions, such as a flat metal product. According to this method, a table is provided which is adapted to support the article. The table is provided with a plurality of thickness references, each having upper and lower surfaces, that are spaced across the width of the table at or near a first end thereof. The table is also provided with one or more openings across its length and width for access to the lower surface of the article on the table. A plurality of pairs of opposed sensors are also provided. The pairs of sensors are mounted at spaced intervals on a carriage that extends across the width of the table and is adapted for movement in the longitudinal direction or down the length of the table. A first member of each pair of sensors is disposed above the level of the supporting surface of the table opposite a second member that is disposed therebelow. The article is placed on the supporting surface of the table with one end of the article near the second end of the table so that the article does not cover the thickness references. The carriage is then positioned at a first location so that each pair of sensors mounted thereon will be in alignment with and accessible to a thickness reference, with the first member of each such pair of sensors being disposed above the thickness reference opposite the second member that is disposed therebelow. Each pair of sensors is then activated to measure the thickness of the thickness reference with which it is aligned, and calibrated according to the thickness of the thickness reference so measured. The carriage is then moved, in stepwise fashion, to one or more subsequent locations along the length of the table that define points of measurement for the sensor pairs, so that at each such location the first member of each pair of sensors mounted on the carriage is disposed above the article on the table opposite the second member that is disposed therebelow and in alignment with an opening in the table that provides access to the lower surface of the article. Each pair of sensors is activated at each subsequent location to which the carriage is moved to measure the thickness of the article at such points of measurement.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various changes are contemplated such as would ordinarily occur to one skilled in the art to which the invention relates.

BRIEF DESCRIPTION OF THE DRAWINGS

FIG. 2 is a side elevation of the apparatus of FIG. 1, taken along lines 2—2 of FIG. 1.

FIG. 4 is an enlarged view of a portion of the apparatus of FIG. 3.

FIG. 5 is a sectional view of the portion of the preferred embodiment illustrated in FIG. 4, taken along lines 5—5 of FIG. 4.

FIG. 6 is a top view of the mastering bar that is a part of the preferred embodiment of FIG. 1.

FIG. 7 is a front view of the mastering bar of FIG. 6, taken along lines 7—7 of FIG. 6.

FIG. 7a is a sectional view of a portion of the mastering bar of a preferred embodiment of the invention, taken along lines 7a—7a of FIG. 6.

DESCRIPTION OF THE PREFERRED EMBODIMENT

Figure 1:
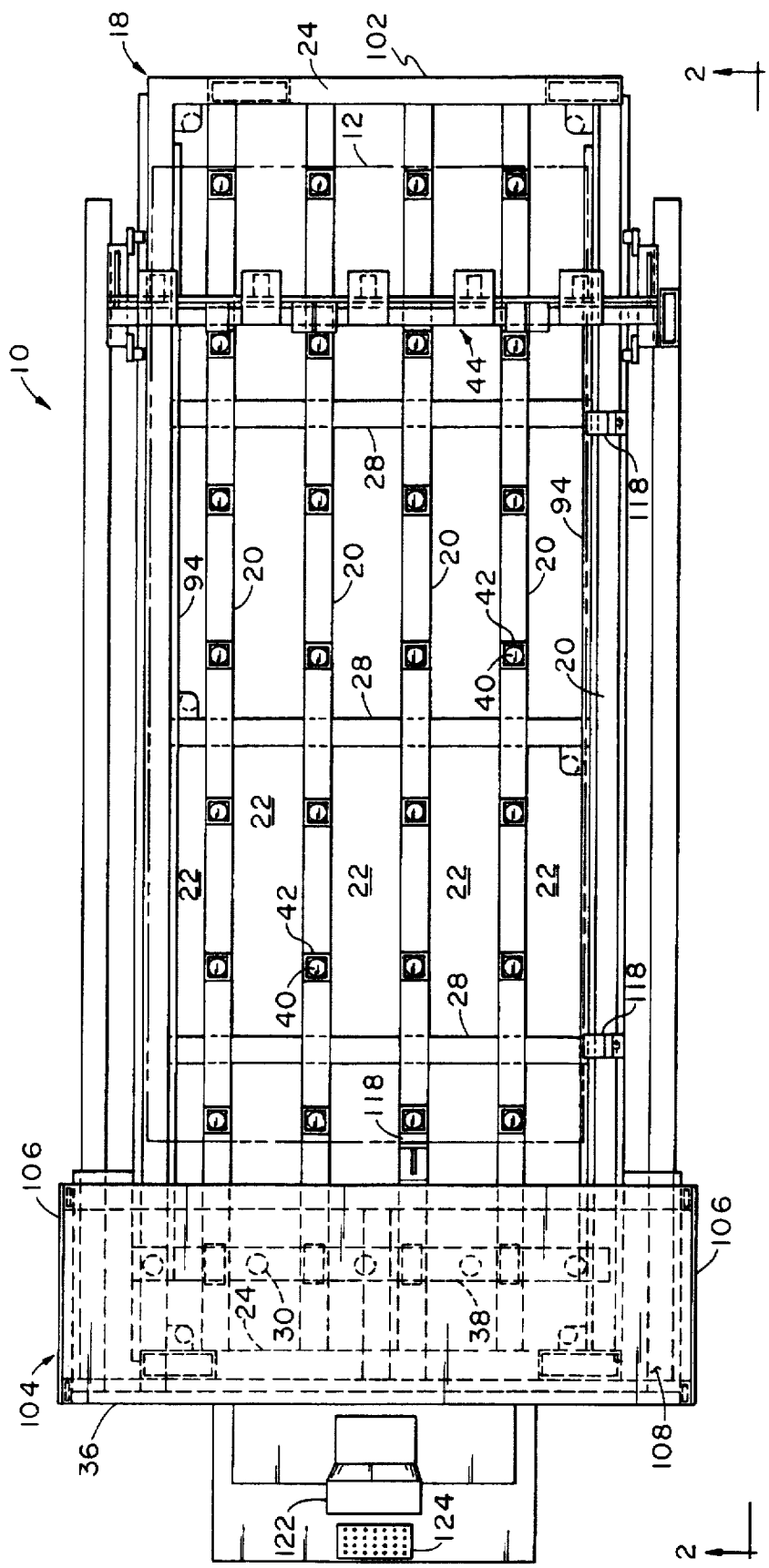
FIG. 1 is a top view of a preferred embodiment of an apparatus that may be used to carry out the invention.
Figure 3:
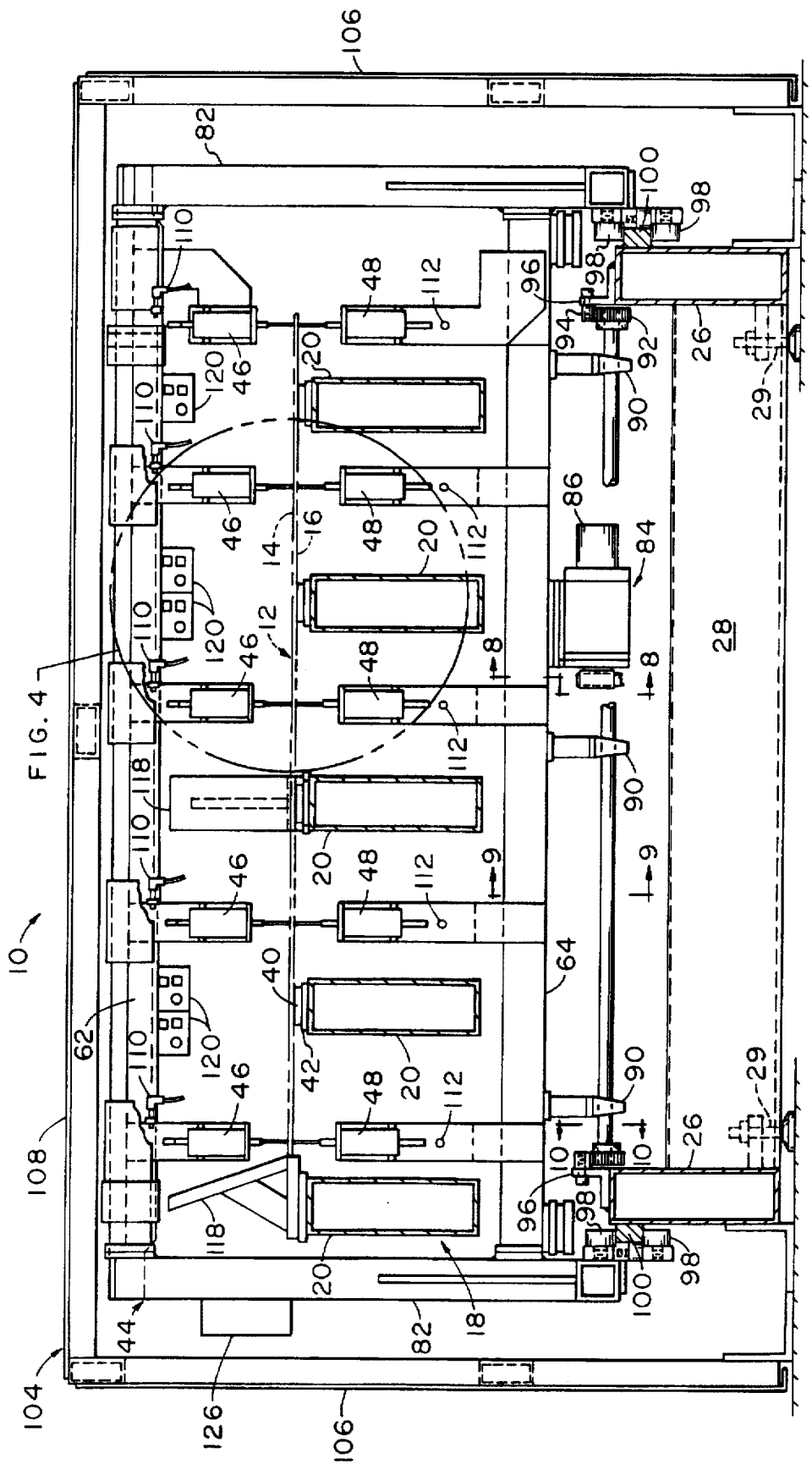
FIG. 3 is a sectional view of the apparatus of FIGS. 1 and 2, taken along lines 3—3 of FIG. 2.
Figure 8:
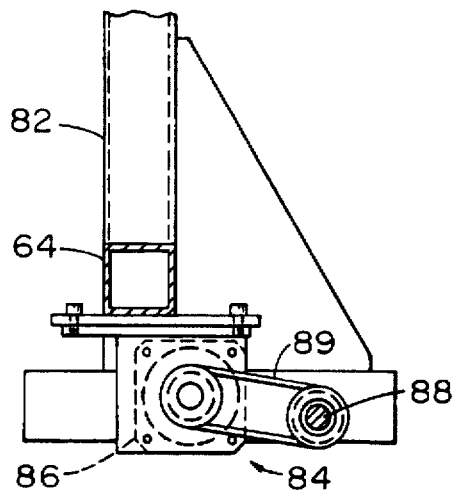
FIG. 8 is a sectional view of a portion of the carriage drive mechanism of a preferred embodiment of the invention, taken along lines 8—8 of FIG. 3.
Figure 9:
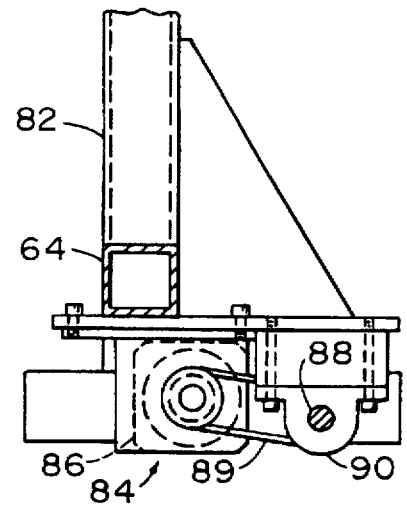
FIG. 9 is a sectional view of a portion of the carriage drive mechanism of a preferred embodiment of the invention, taken along lines 9—9 of FIG. 3.

Referring now to the drawings, FIGS. 1 through 3 illustrate machine 10, which is a preferred embodiment of the apparatus of the invention. Machine 10 may be used according to the method of the invention to measure the thickness of an article, such as plate 12 (shown in FIGS. 2 through 5), having upper and lower surfaces, 14 and 16 respectively (best shown in FIGS. 4 and 5), and substantial length and width dimensions (not shown). Such articles may be comprised of a variety of materials and may be of a variety of sizes. Plate 12 may be a flat metal product, such as a sheet or plate of aluminum or other metal. Machine 10 may be of any convenient size, as necessary to support an article in order to carry out the invention. For example, if machine 10 is used for measuring the thickness of a cast aluminum plate that has a length within the range of 12–150 inches, a width within the range of 12–73 inches, and a thickness within the range of 0.25–2.00 inches, such a plate may weigh as much as 1750 pounds. In order to accommodate such a plate, machine 10 may be on the order of twenty feet long by eight feet wide.

Machine 10 includes table 18 which is comprised of a plurality of longitudinally disposed rail sections 20 that are spaced apart across the width of the table with openings 22 therebetween, for access to the lower surface 16 of plate 12 on the table. Rail sections 20 of table 18 are supported at either end by end supports 24. End supports 24 act to suspend the rail sections above base rails 26 at either side of table 18. Additional support, strength and rigidity for the table is provided by cross members 28 between the two base rails. Preferably, rail sections 20, end supports 24, base rails 26 and cross members 28 are all made of steel. A plurality of leveling adjustment bolts 29, two of which are shown in FIG. 3, are preferably used to maintain the supporting surface of the table in a horizontally level condition.

Of course, the table may be configured differently than as described and illustrated herein. For example, the table may include as few as two or three rail sections, depending on the size of the article, the thickness of which is to be measured. It may be configured with a generally planar supporting surface that is provided with a plurality of holes, or it may be configured in other ways. It must, however, be adapted to support the article, the thickness of which is to be measured, and it must be provided with one or more openings across its length and width for access to the lower surface of the article on the table.

A plurality of thickness references 30, each having upper and lower surfaces 32 and 34 respectively, are spaced across the width of table 18 at or near a first end 36 thereof. Preferably, these thickness references are incorporated in mastering bar 38 (see FIGS. 6, 7 and 7a). The thickness references are used to calibrate the sensors that measure the thickness of the article on the table. Preferably, thickness references 30 are circular disks comprised of a material such as hardened and polished tool steel, that are machined so as to be of a known thickness. Preferably thickness references 30 are precisely 1.000 inches thick. Mastering bar 38 is mounted across the top of rail sections 20 by any convenient means. Preferably the mastering bar is bolted to the rail sections, although it may also be welded into place. As shown in FIG. 1, the mastering bar is mounted so that thickness references 30 are disposed above openings 22 between the rail sections and (outside the outer rail sections on either side of the table) the base rails.

Preferably, the table is also provided with a non-marring supporting surface, so that the surface finish of the article will not be marked by contact with the table. In the embodiment of the invention illustrated in the drawings, each of rail sections 20 of the table is provided with a plurality of non-metallic support disks 40 spaced along the length thereof, to provide this non-marring supporting surface. Preferably, disks 40 are comprised of nylon or a similar material that will not mar the lower surface of plate 12, which in the case of the cast aluminum plate discussed hereinabove, may have been milled, for example, using a planar mill, to a twenty-microinch (or better) finish. In order to support plate 12, disks 40 are preferably provided with a diameter within the range of 3-4 inches, and a thickness within the range of 1-2 inches. The disks are mounted on the rail sections by any convenient method. In a preferred embodiment, the disks are bored with a central hole through their center and bolted to the tops of rail sections 20. Preferably, the disks are centered within guides 42, which are box-shaped structures, preferably of steel, that are welded onto the top of the rail sections, and which help to keep the disks in place thereon. The disks are also preferably milled so that their upper supporting surfaces are in the same plane as the lower surfaces 34 of thickness references 30.

Machine 10 is also provided with a plurality of pairs of opposed sensors that are mounted at spaced intervals on a carriage 44 that extends across the width of the table. A first member 46 of each pair of sensors is disposed above the level of the supporting surface of the table opposite a second member 48 that is disposed therebelow. Although any sensor that is capable of measuring the distance from a reference position to a surface of an article may be used in the invention, preferred results have been obtained when the sensors are of the contact type that operate by measuring the distance of travel of a contact probe, such as the sensors designated as Model No. 543-525-A Digimatic Indicators that are sold by Mitutoyo Corporation of 31-19, Shiba 5-chome, Minato-ku, Tokyo 108, Japan. Thus, as shown in the drawings (especially FIGS. 4 and 5), upper sensor 46 includes contact probe 50 and lower sensor 48 includes contact probe 52. Each of the preferred Mitutoyo Digimatic Indicator sensors operates by counting signals from a photoelectrical linear encoder detector unit to measure the displacement of its contact probe.

The sensors are mounted on carriage 44 by means of upper sensor support members 54 and 56 and lower sensor support members 58 and 60. Upper sensor support members 56 are mounted directly on carriage top bar 62 by any suitable means, such as welding or bolting, and support members 54 are mounted to support members 56, also by any suitable means, as best viewed in FIGS. 4 and 5. In like manner, lower sensor support members 60 are mounted directly on carriage bottom bar 64, and support members 58 are mounted to support members 60. Of course, each pair of support members 54 and 56 could be provided as a unitary structure, as could each pair of support members 58 and 60. In the alternative, other arrangements and structures could be provided to support the first or upper members 46 and the second or lower members 48 of each pair of opposed sensors, especially if the sensors employed are the type that operate other than by measuring the distance of travel of a contact probe.

Contact probes 50 and 52 of upper and lower sensors 46 and 48 extend all the way through their associated sensors and are adapted for sliding movement therein along their long axes. The contact probes of the Model No. 543-525-A Digimatic Indicators sold by Mitutoyo Corporation each have a stroke of 2.0 inches. Probes 50 and 52 are biased in the extended position by means of internal springs housed in spring housings 66 and 68 respectively. This means that contact probe 50 is biased downwardly towards upper surface 14 of plate 12 by its associated spring, and contact probe 52 is biased upwardly towards lower surface 16 of plate 12 by its associated spring. As might be expected, the springs in lower sensors 48 are slightly stiffer than those in upper sensors 46, because they must overcome the effects of gravity, while the springs in the upper sensors are aided by its effects. Although the springs in the preferred Model No. 543-525-A Digimatic Indicators that are employed as the upper sensors in the preferred embodiment are the same as are supplied by Mitutoyo Corporation, the "off-the shelf" springs in the preferred lower sensors of the same type have been replaced with slightly stiffer springs in the preferred embodiment of the invention that is illustrated in the drawings.

Also associated with upper sensors 46 are upper air cylinders 70, which are mounted on upper sensor support members 54, by being fitted into a hole bored in member 54 or by other suitable means. Piston 72 of each upper cylinder 70 is coupled to the upper end of contact probe 50 by means of probe coupling 74, so that the air cylinder may be activated by suitable means (not shown) to extend its piston 72 and thereby retract contact probe 50 against the bias of its associated spring and thereby move it upwardly away from the upper surface 14 of plate 12. In similar fashion, lower air cylinders 76 are associated with lower sensors 48, and cylinders 76 are mounted on lower sensor support members 58. Piston 78 of each lower cylinder 76 is coupled to the lower end of contact probe 52 by means of probe coupling 80, so that the air cylinder may be activated to extend its piston 78 and thereby retract contact probe 52 against the bias of its associated spring and thereby move it downwardly away from the lower surface 16 of plate 12.

Figure 10:
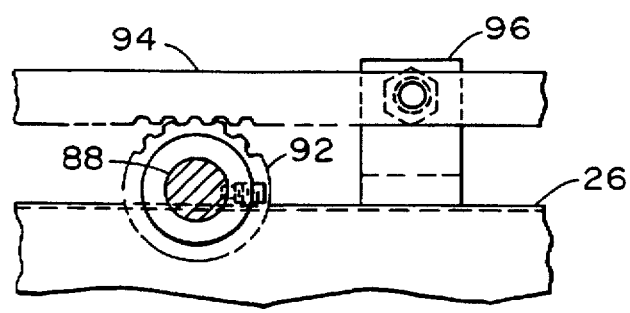
FIG. 10 is a sectional view of a portion of the carriage drive mechanism of a preferred embodiment of the invention, taken along lines 10—10 of FIG. 3.

Carriage 44 is comprised of top bar 62 and bottom bar 64, as has been mentioned, and a pair of side supports 82 (see FIG. 3), each of which is joined to top bar 62 and bottom bar 64 by any convenient or suitable means, such as welding or bolting. Carriage 44 is also adapted for movement in the longitudinal direction or along the length of the table, and carriage drive mechanism 84 is provided for this purpose. The carriage drive mechanism may operate according to any known or subsequently developed method, so long as it is capable of moving the carriage from first end 36 to one or more subsequent locations along the length of the table that define points of measurement for the sensor pairs. As shown in FIGS. 3 and 8 through 10, the preferred embodiment of the carriage drive mechanism includes drive motor 86, which is adapted to turn drive shaft 88 by means of timing belt 89. Shaft 88 is journaled in and supported by a plurality of support bearings 90, which are fastened onto bottom bar 64 of the carriage. At each end of shaft 88 is located a pinion gear 92 which engages with rack 94 to advance the carriage. As shown in FIGS. 3 and 10, each rack 94 is mounted on a base rail 26 by means of rack support 96. As the pinion gear and rack on each side of the carriage cooperate to move the carriage, further support and alignment security is provided by carriage support wheels 98 that ride on guide rails 100, mounted outside each of base rails 26.

Cable jacket 101, located beneath the carriage (see FIG. 2) contains cables for conducting power to the sensors and their associated instrumentation (discussed hereinafter) and for conducting signals from the sensors and their instrumentation to a computer processor (also discussed hereinafter). The jacket keeps the cables together and out of the way of the carriage drive mechanism as the carriage is moved along the length of the table.

When it is desired to begin the process of measuring the thickness of an article such as plate 12, the article must be placed on the supporting surface of table 18 with one end of the article near second end 102 of the table so that the article does not cover thickness references 30, which are used to calibrate sensors 46 and 48. Preferably, the table is provided with a protective garage 104 (comprised of supporting sides 106 and cover 108) that extends over a first location of the carriage where each pair of sensors 46 and 48 are in alignment with and accessible to a thickness reference 30 on mastering bar 38, with first member 46 of each such pair of sensors being disposed above a thickness reference 30 opposite second member 48 that is disposed therebelow. As has been mentioned, the mastering bar is mounted so that thickness references 30 are disposed above openings 22 between the rail sections and (outside the outer rail sections on either side of the table) the base rails. This arrangement permits access by the second (or lower) members 48 of each sensor pair to lower surface 34 of each thickness reference 30.

FIG. 2 shows the carriage, in phantom lines, at the first location within the garage. Garage 104 permits the carriage to be positioned at the first location within the garage while plate 12 is placed onto table 18, thereby minimizing the risk of damage to the carriage or to the sensors mounted thereon during placement of the plate on the table. In addition, carriage awning 109 (shown in FIG. 5, but deleted from FIG. 4) may be mounted atop carriage top bar 62 by welding, bolting or other suitable means to provide additional protection for the sensors in each pair.

Preferably, a pair of limit switches 110 and 112 associated with each sensor pair will be used to determine if the contact probe of each sensor has been retracted before the carriage is positioned at the first location. Thus, before the carriage can be positioned at the first position, limit switch 110 (associated with each of upper sensors 46) must sense that end 114 of probe 50 is in alignment therewith, thereby to insure that piston 72 is in the extended position so that probe 50 has been withdrawn upwardly. Similarly, limit switch 112 (associated with each of lower sensors 48) must sense that end 116 of probe 52 is in alignment therewith, thereby to insure that piston 78 is in the extended position so that probe 52 has been withdrawn downwardly.

Preferably, the table is also provided with an article-locating mechanism so that the article to be measured may be placed on the table in a known position relative to the carriage. Such an article-locating mechanism may comprise a plurality of edge locators 118, at least one of which is located along a longitudinal side of the table (two such edge locators are shown along a longitudinal side of table 18 in the drawings) and at least one of which is located near first end 36 of the table, so that the plate may be placed on the table in a known position relative to the carriage. Thus, plate 12 is placed on table 18 so that one edge thereof is adjacent to and in abutment with the edge locator near first end 36 of the table, and another edge of the plate is adjacent to and in abutment with the edge locators along the longitudinal side of the table. As shown in the drawings, the edge locators are arranged so as to locate a rectangular or square plate on the table. Of course, the plate need not be of such shape, and if it is of any other shape, the arrangement of the edge locators may be adjusted to accommodate its shape.

With the plate in place on the table and the carriage in position at the first location, each pair of sensors (comprised of sensors 46 and 48) is activated to measure the thickness of a thickness reference 30 with which the sensor pair (comprised of sensors 46 and 48) is aligned. It is preferred that each member of a sensor pair be activated simultaneously, and moreover, that all sensor pairs be activated at the same time. Upon activation of each pair of sensors, piston 72 is withdrawn into cylinder 70 so that the spring in spring housing 66 will extend probe 50 downwardly towards upper surface 32 of thickness reference 30, and piston 78 is withdrawn into cylinder 76 so that the spring in spring housing 68 will extend probe 52 upwardly towards lower surface 34 of the thickness reference. Information relating to the distance traveled by each contact probe in each sensor pair will thereby be obtained, and this information will be used to calibrate each pair of sensors according to the thickness of the thickness reference so measured. Each sensor pair (comprised of upper sensor 46 and lower sensor 48) has associated with it an instrumentation unit 120 that is located adjacent thereto, and which is used to calibrate each sensor pair (when measuring the thickness of the thickness reference) and to use the information obtained from the various measurements taken by the sensor pairs to calculate the thickness of the plate at each point of measurement. The instrumentation units are preferably difference/sum units that operate to add or subtract the measurement data obtained from the two sensors in a pair in order to determine the thickness of the reference disk or plate therebetween. When the Model No. 543-525-A Digimatic Indicators sold by Mitutoyo Corporation are used in connection with the invention, a Digimatic Difference/Sum Unit, designated as Model No. 572-041-A and also sold by Mitutoyo Corporation, is preferably used in association with each sensor pair (comprised of upper sensor 46 and lower sensor 48). As shown in FIGS. 3 through 5, each instrumentation unit may be bolted or otherwise attached to carriage top bar 62 in the vicinity of the sensor pair to which it relates. As shown in FIG. 4, the rightmost of two instrumentation units 120 is associated with the sensor pair on the right, and the leftmost of the two units is associated with the sensor pair on the left.

After the sensors are activated to measure the thickness of the thickness references and calibrate the sensors, the carriage may be moved, in stepwise fashion, to one or more subsequent locations along the length of the table that define points of measurement for the sensor pairs. When it is desired to move carriage 40 from the first position, cylinder 70 is activated to retract probe 50 upwardly away from the upper surface of the plate, and cylinder 76 is activated to retract probe 52 downwardly away from the lower surface of the plate, so that the probes will be out of the way for subsequent movement. Preferably, as has been mentioned, limit switches 110 and 112 are used to determine if the contact probe of each sensor has been retracted before the carriage is moved to the second and subsequent locations. Thus, before the carriage can be moved from the first position, limit switch 110 (associated with each of upper sensors 46) must sense that end 114 of probe 50 is in alignment therewith, thereby to insure that piston 72 is in the extended position so that probe 50 has been withdrawn upwardly. Similarly, limit switch 112 (associated with each of lower sensors 48) must sense that end 116 of probe 52 is in alignment therewith, thereby to insure that piston 78 is in the extended position so that probe 52 has been withdrawn downwardly.

When the probes have been safely withdrawn, carriage 44 may be moved to a second, and if desired, subsequent positions on the table to take measurements of the thickness of plate 12 according to the invention. FIG. 2 shows carriage 44 in position at one such location. At each such location, the first member 46 of each pair of sensors mounted on the carriage is disposed above plate 12 on the table opposite the second member 48 that is disposed therebelow and in alignment with an opening 22 in the table that provides access to lower surface 16 of the plate. At each such position to which the carriage is moved, each pair of sensors is activated to measure the thickness of the plate at such points of measurement. Upon activation of each pair of sensors, piston 72 is withdrawn into cylinder 70 so that the spring in spring housing 66 will extend probe 50 downwardly towards upper surface 14 of plate 12, and piston 78 is withdrawn into cylinder 76 so that the spring in spring housing 68 will extend probe 52 upwardly towards lower surface 16 of the plate. Information relating to the distance traveled by each contact probe in each sensor pair will thereby be obtained, and this information will be compared (by its associated instrumentation unit 120) with the information obtained from the measurement of the thickness reference associated with that sensor pair to determine the thickness of the plate at each such position of measurement.

The thickness of the plate is determined at each point of measurement by comparing the distances traveled to upper surface 14 and lower surface 16 of the plate by the contact probes of the first 46 and second 48 members of the sensor pair with the distances traveled to the upper surface 32 and lower surface 34 of the thickness reference associated with (in alignment with, at the first position of the carriage) the sensor pair by said contact probes. More specifically, the relative location of the upper surface 14 of the plate is determined by comparing the distance traveled to said upper surface by contact probe 50 of first (or upper) member 46 of the sensor pair with the distance traveled to upper surface 32 of the thickness reference by said first contact probe. The relative location of the lower surface 16 of the plate is determined by comparing the distance traveled to said lower surface by contact probe 52 of the second (or lower) member 48 of the sensor pair with the distance traveled to lower surface 34 of the thickness reference by said second contact probe. The relative location of the upper surface of the plate is then compared with the relative location of the lower surface thereof to determine the thickness of the plate at that point of measurement.

Preferably, pairs of opposed sensors are mounted on carriage 44 across the width of the table at substantially equal intervals within the range of 3–24 inches. Good results have been obtained when the sensor pairs have been located about one foot apart on the carriage. Thus, as shown in the drawing, five pairs of sensors are disposed at substantially equal intervals across the width of the table.

In addition, it is also preferred that the invention be used to take measurements at a plurality of locations along the length of the table, as well as along its width. Thus, the second location is preferably located a distance within the range of 1–24 inches from the first location, and each subsequent location along the length of the table is approximately the same distance away from the preceding one.

Good results have been obtained when the carriage is moved to second, third and subsequent locations for measurement, where each such location is approximately one foot from the preceding one. A computer (not shown) may be used to program the locations of the second and subsequent points of measurement. Such a computer may be set up so that terminal 122 and associated keyboard 124 may be used to input the necessary information.

After all thickness measurements of the plate are made, a map or drawing of the plate showing its thicknesses at the various points of measurement may then be produced. Such a map may be generated by a computer processor such as processor 126 (see FIG. 3) from the information obtained from the various sensor pairs and their associated difference/sum units. This map may be printed and provided to the purchaser of the plate or other article measured to demonstrate compliance with the thickness requirements specified, and to quantify quality assurance capability. Preferred results may be obtained when the processor used in conjunction with the Mitutoyo sensor pairs and their associated difference/sum units is the Model No. 982-531-A Multiplexer that is sold by Mitutoyo Corporation.

The preferred embodiment of the invention described herein can be used to measure the thickness of a flat metal product across its width and length. The contact-type sensors described herein can provide measurements of the thickness of such an article that are accurate to within one ten-thousandth of an inch. Furthermore, the preferred embodiment of the invention takes little time to set up, and can be used to measure and map the thickness of an article in a matter of minutes.

Although this description contains many specifics, these should not be construed as limiting the scope of the invention but as merely providing illustrations of a presently preferred embodiment thereof, as well as the best mode contemplated by the inventors for practicing the invention. The invention may be utilized to measure the thickness of any article having upper and lower surfaces and substantial length and width dimensions, and as described herein, the invention is susceptible to various modifications and adaptations, which are intended to be comprehended within the meaning and range of equivalents of the appended claims.

What is claimed is:

1. A method for measuring the thickness of an article having upper and lower surfaces and substantial length and width dimensions, which method comprises:

(a) providing a table which is adapted to support the article, which table is provided with:
    (i) a supporting surface upon which the article may be placed; and
    (ii) a plurality of thickness references, each having upper and lower surfaces, that are spaced across the width of the table at or near a first end thereof; and
    (iii) one or more openings across its length and width for access to the lower surface of the article on the table;
  (b) providing a plurality of pairs of opposed sensors that are mounted at spaced intervals on a carriage that extends across the width of the table and is adapted for movement in the longitudinal direction of the table, wherein a first member of each pair of sensors is disposed above the level of the supporting surface of the table opposite a second member that is disposed therebelow;
  (c) placing the article on the supporting surface of the table without covering the thickness references;

(d) positioning the carriage at a first location so that each pair of sensors mounted thereon will be in alignment with and accessible to one of said thickness references, with the first member of each such pair of sensors being disposed above one of said thickness references opposite the second member that is disposed therebelow;

(e) activating each pair of sensors to measure the thickness of the thickness reference with which it is aligned;

(f) calibrating each pair of sensors according to the thickness of the thickness reference so measured;

(g) moving the carriage, in stepwise fashion, to one or more subsequent locations along the length of the table that define points of measurement for the sensor pairs, so that at each such location the first member of each pair of sensors mounted on the carriage is disposed above the article on the table opposite the second member that is disposed therebelow and in alignment with one of said openings in the table that provides access to the lower surface of the article;

(h) activating each pair of sensors at each subsequent location to which the carriage is moved to measure the thickness of the article at such points of measurement.

2. The method of claim 1, wherein the table is comprised of a plurality of longitudinally disposed rail sections that are spaced apart across the width of the table with the openings therebetween, and wherein each pair of sensors on the carriage is located so that one of said openings between the rail sections provides access for the second member of each such pair to the lower surface of the article.

3. The method of claim 1, wherein the supporting surface of the table is a non-marring surface, so that the surface finish of the article will not be marked by contact with the table.

4. The method of claim 1, wherein the article comprises a sheet or plate of aluminum or an aluminum alloy.

5. The method of claim 1, wherein the table is provided with a protective garage that extends over the first location of the carriage, so that the carriage may be positioned at the first location within the garage while the article is placed onto the table, thereby minimizing the risk of damage to the carriage or to the sensors mounted thereon during placement of the article on the table.

6. The method of claim 1, wherein the pairs of opposed sensors are mounted on the carriage that extends across the width of the table at substantially equal intervals within the range of three to twenty-four inches.

7. The method of claim 1, wherein the second location is located a distance within the range of one to twenty-four inches from the first location, and each subsequent location along the length of the table is approximately the same distance away from the preceding one.

8. The method of claim 1, wherein all of the pairs of sensors are activated simultaneously at the first location, and all are activated simultaneously at each point of measurement.

9. The method of claim 1, wherein the table is provided with an article-locating mechanism so that the article may be placed on the table in a known position relative to the carriage.

10. The method of claim 9, wherein after all thickness measurements of the article are made, a map of the article showing its thicknesses at the points of measurement is produced.

11. The method of claim 1, wherein each of said members of said pairs of opposed sensors is a contact sensor that operates by measuring the distance of travel of a contact probe.

12. The method of claim 11, wherein the thickness of the article is determined at each point of measurement by comparing the distances traveled to the upper and lower surfaces of the article by the contact probes of the first and second members of the sensor pair with the distances traveled to the upper and lower surfaces of the thickness reference by said contact probes.

13. The method of claim 11, wherein each of the contact sensors is spring-biased toward an extended position of the contact probe, and the contact probe is retracted before the carriage is positioned at the first location or moved to the second and subsequent locations.

14. The method of claim 13, wherein a limit switch is utilized to determine if the contact probe of each sensor has been retracted before the carriage is positioned at the first location or moved to the second and subsequent locations.

15. A method for measuring the thickness of a flat metal product having upper and lower surfaces and substantial length and width dimensions at a plurality of locations across the length and width of the product, which method comprises:

(a) providing a table comprised of a plurality of longitudinally disposed rail sections that are spaced apart in a parallel relation with openings therebetween, with each rail section having an upper surface that is adapted to support a portion of the product, so that said surfaces of the rail sections comprise a supporting surface of the table that is adapted to support the product;

(b) providing a plurality of pairs of opposed sensors that are mounted at spaced intervals on a carriage that extends across the width of the table and is adapted for movement in the longitudinal direction of the table, wherein a first member of each pair of sensors is disposed above the level of the supporting surface of the table opposite a second member that is disposed therebelow;

(c) providing a plurality of thickness references, in a number equal to the number of pairs of opposed sensors, with each such thickness reference having upper and lower surfaces, and being located at or near a first end of the table in a position such that an opening between the rail sections of the table provides access to the upper and lower surfaces thereof;

(d) placing the product on the supporting surface of the table without covering the thickness references;

(e) positioning the carriage at a first location so that each pair of sensors mounted thereon will be in alignment with and accessible to one of said thickness references, with the first member of each such pair of sensors being disposed above one of said thickness references opposite the second member that is disposed therebelow;

(f) simultaneously activating each pair of sensors to measure the thickness of the thickness reference with which it is aligned;

(g) calibrating each pair of sensors according to the thickness of the thickness reference so measured;

(h) moving the carriage, in stepwise fashion, to one or more subsequent locations along the length of the table that define points of measurement for the sensor pairs, so that at each such location the first member of each pair of sensors mounted on the carriage is disposed above the product on the table opposite the second member that is disposed therebelow and in alignment with one of said openings in the table that provides access to the lower surface of the product;

(i) simultaneously activating each pair of sensors at each subsequent location to which the carriage is moved to measure the thickness of the product at such points of measurement.

16. The method of claim 15, wherein each of said members of said pairs of opposed sensors is a contact sensor that operates by measuring the distance of travel of a contact probe.

17. The method of claim 16, wherein the thickness of the product is determined at each point of measurement by:
   (a) determining the relative location of the upper surface of the product by comparing the distance traveled to the upper surface of the product by the contact probe of the first member of the sensor pair with the distance traveled to the upper surface of the thickness reference by the first contact probe;
   (b) determining the relative location of the lower surface of the product by comparing the distance traveled to the lower surface of the product by the contact probe of the second member of the sensor pair with the distance traveled to the lower surface of the thickness reference by the second contact probe;
   (c) comparing the relative location of the upper surface of the product with the relative location of the lower surface thereof.

18. An apparatus for measuring the thickness of an article having upper and lower surfaces and substantial length and width dimensions at a plurality of locations across the width of the article, comprising:
   (a) a table which is adapted to support the article, which table is provided with:
      (i) a supporting surface upon which the article may be placed; and
      (ii) a plurality of thickness references, each having upper and lower surfaces, that are spaced across the width of the table at or near a first end thereof so that the article may be placed on the supporting surface of the table without covering the thickness references; and
      (iii) a plurality of openings across its length and width for access to the lower surfaces of the article on the table;
   (b) a plurality of pairs of opposed sensors that are mounted at spaced intervals on a carriage that extends across the width of the table and is adapted for movement in the longitudinal direction of the table, so that a first member of each pair of sensors is disposed above the level of the supporting surface of the table opposite a second member that is disposed therebelow; and
   (c) means for positioning the carriage at a first location so that each pair of sensors mounted thereon will be in alignment with and accessible to one of said thickness references, with the first member of each such pair of sensors being disposed above one of said thickness references opposite the second member that is disposed therebelow; and
   (d) means for activation of each pair of sensors to measure the thickness of the thickness reference with which they are aligned; and
   (e) means for calibration of each pair of sensors according to the thickness of the thickness reference measured; and
   (f) means for moving the carriage in stepwise fashion, to one or more subsequent locations along the length of the table that define points of measurement for the sensor pairs, so that at each such location to which the carriage may be moved, the first member of each pair of sensors mounted on the carriage will be disposed above the article on the table opposite the second member that is disposed therebelow and in alignment with one of said openings in the table that provides access to the lower surface of the article; and
   (g) means for activation of each pair of sensors at each subsequent location to which the carriage is moved so that said sensors may be employed to measure the thickness of the article at such points of measurement.

19. The apparatus of claim 18, which includes a protective garage that extends over the first location of the carriage, so that the carriage may be positioned at the first location within the garage while the article is placed onto the table, thereby minimizing the risk of damage to the carriage or to the sensors mounted thereon during placement of the article on the table.

20. The apparatus of claim 18, wherein the table is provided with a plurality of edge locators, at least one of which is located along a longitudinal side of the table and at least one of which is located near the first end of the table, so that the article may be placed on the table in a known position relative to the carriage.

21. The apparatus of claim 18, wherein the pairs of opposed sensors are mounted at intervals of approximately one foot on the carriage that extends across the width of the table.

22. The apparatus of claim 18, wherein the second location of the carriage is approximately one foot from the first location, and each subsequent location is approximately one foot from the preceding one.

23. The apparatus of claim 18, wherein the table is comprised of a plurality of longitudinally disposed rail sections that are spaced apart across the width of the table with openings therebetween, and wherein each pair of sensors on the carriage is located so that one of said openings between the rail sections provides access for the second member of each such pair to the lower surface of the article.

24. The apparatus of claim 23, wherein each of the rail sections of the table is provided with a plurality of non-metallic support disks spaced along the length thereof, so that the surface finish of the plate will not be marked by contact with the table.

25. The apparatus of claim 18, wherein each of said members of said pairs of opposed sensors is a contact sensor that operates by measuring the distance of travel of a contact probe.

26. The apparatus of claim 25, wherein each of the contact sensors is spring-biased toward an extended position of the contact probe, and an air cylinder is provided to retract the contact probe before the carriage is positioned at the first location or moved to the second and subsequent locations.

27. The apparatus of claim 26, wherein a limit switch is utilized to determine if the contact probe of each sensor has been retracted before the carriage is positioned at the first location or moved to the second and subsequent locations.

* * * * *